United States Patent
Borgia et al.

(10) Patent No.: US 8,925,499 B2
(45) Date of Patent: Jan. 6, 2015

(54) WAX-TYPE THERMOSTAT WITH WAX OVERHEATING SAFETY MEANS

(71) Applicant: GM Global Technology Operations LLC, Detroit, MI (US)

(72) Inventors: Luca Borgia, Busano (IT); Carmine Pezzella, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 13/650,641

(22) Filed: Oct. 12, 2012

(65) Prior Publication Data

US 2013/0092107 A1    Apr. 18, 2013

(30) Foreign Application Priority Data

Oct. 18, 2011    (GB) .................................. 1117991.8

(51) Int. Cl.
*F01P 7/16*    (2006.01)
*G05D 23/02*    (2006.01)

(52) U.S. Cl.
CPC ............... *F01P 7/16* (2013.01); *G05D 23/022* (2013.01)
USPC .................. 123/41.08; 123/41.02; 123/41.04

(58) Field of Classification Search
CPC ............. F01P 7/14–7/16; G05D 23/02; G05D 23/021; G05D 23/022
USPC .................................. 123/41.04, 41.08, 41.02
See application file for complete search history.

(56) References Cited

U.S. PATENT DOCUMENTS

| | | | |
|---|---|---|---|
| 3,395,580 A * | 8/1968 | Kuze | 60/527 |
| 4,666,081 A * | 5/1987 | Cook et al. | 236/68 R |
| 5,887,556 A | 3/1999 | Kim | |
| 5,961,037 A | 10/1999 | Fiedler et al. | |
| 5,992,755 A * | 11/1999 | Kuze | 236/34.5 |
| 6,772,958 B1 | 8/2004 | Lamb et al. | |

* cited by examiner

*Primary Examiner* — Lindsay Low
*Assistant Examiner* — Kevin Lathers
(74) *Attorney, Agent, or Firm* — Ingrassia Fisher & Lorenz, P.C.

(57) ABSTRACT

A wax-type thermostat for the cooling system of an internal combustion engine (ICE) is provided. The cooling system includes a radiator and a coolant loop circuit linking the radiator to the internal combustion engine, and having a by-pass conduit. The thermostat includes a thermostat body with a radiator inlet, an ICE inlet, via the by-pass conduit, and an ICE outlet. The thermostat further includes a piston integral to a closure element that opens or close a thermostat internal pathway connecting the radiator inlet to the ICE outlet, and a wax chamber thermally connected to the coolant within the thermostat body. The thermostat includes a first spring to return the closure element towards its closing position, and means for moving the piston when a volume variation in the wax occurs.

18 Claims, 4 Drawing Sheets

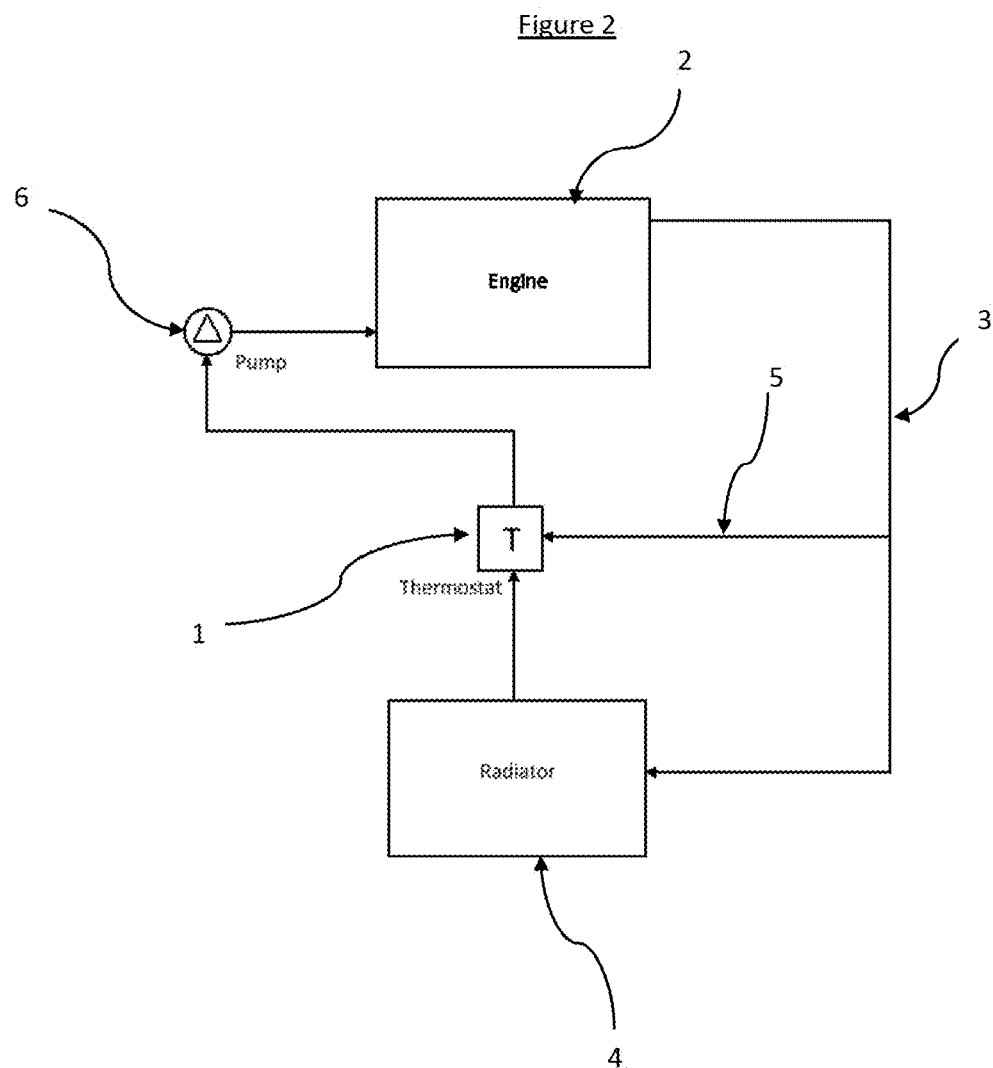

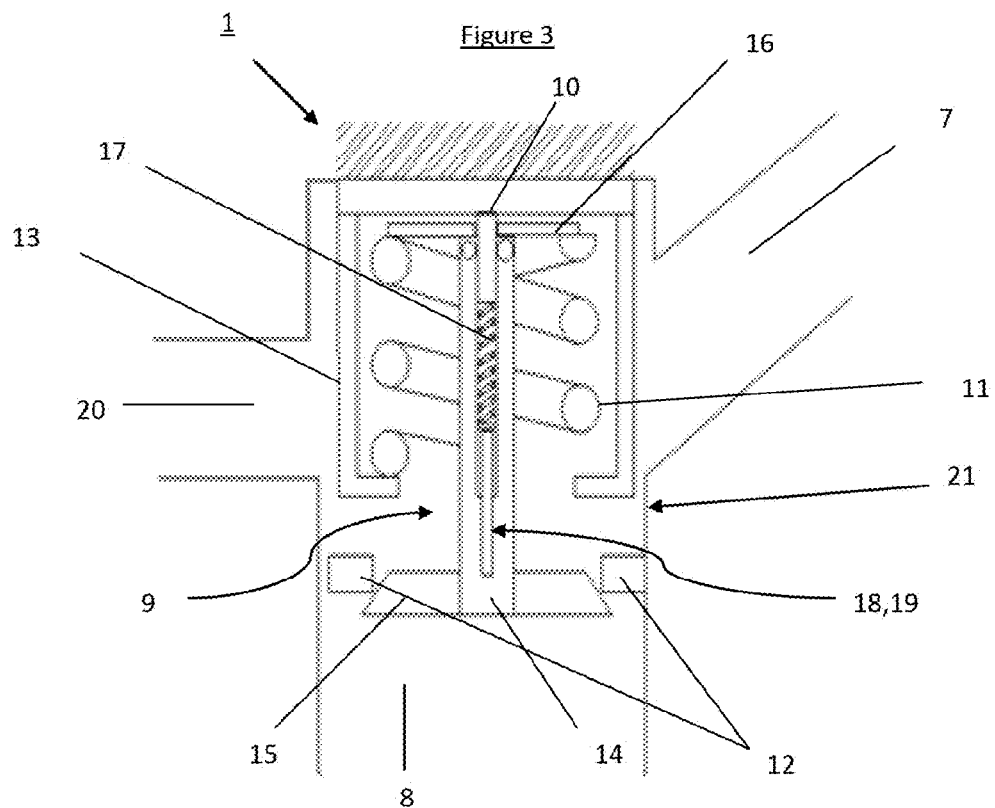
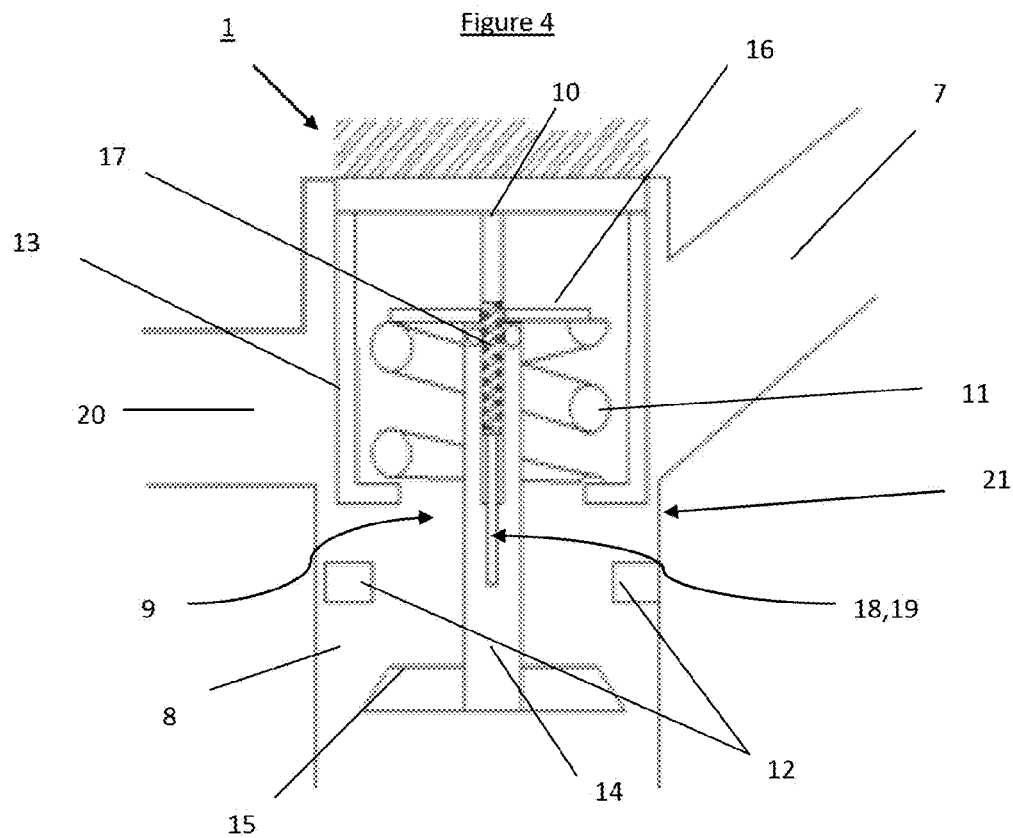

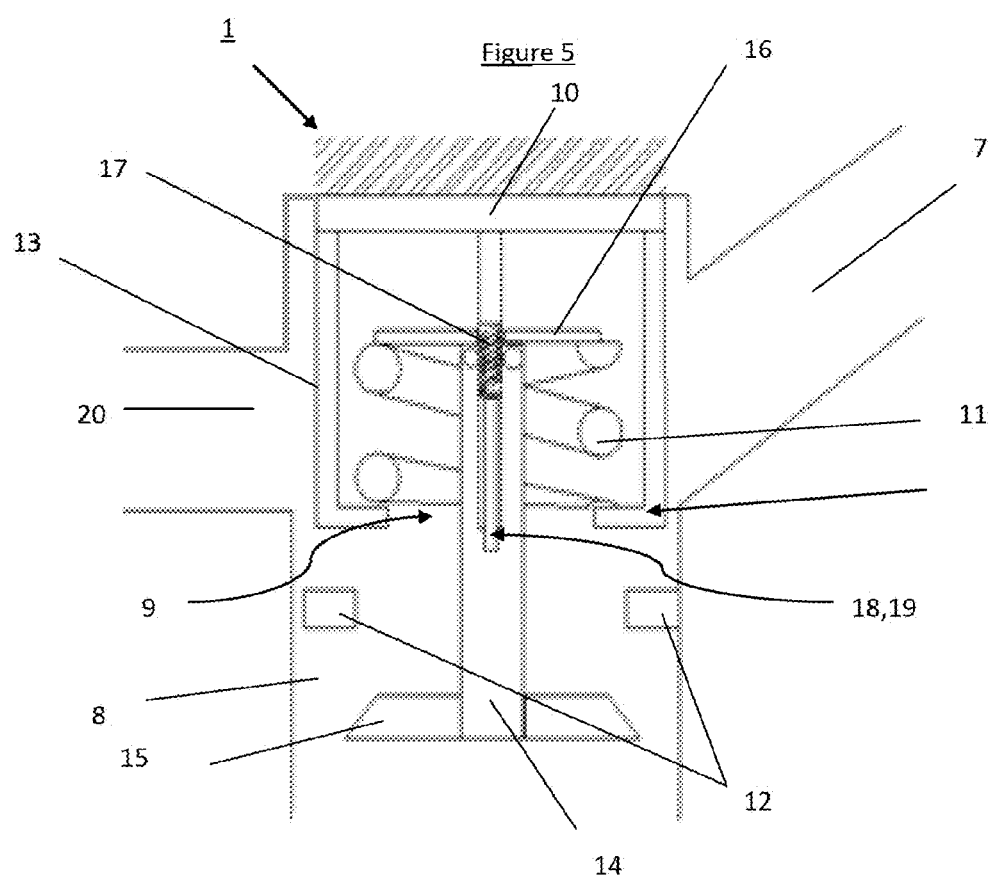

WAX-TYPE THERMOSTAT WITH WAX OVERHEATING SAFETY MEANS

CROSS-REFERENCE TO RELATED APPLICATION

This application claims priority to British Patent Application No. 1117991.8, filed Oct. 18, 2011, which is incorporated herein by reference in its entirety.

TECHNICAL FIELD

This application pertains to a wax-type thermostat for the cooling system of an internal combustion engine (ICE), e.g. an internal combustion engine for a diesel power-train system.

BACKGROUND

As well known in the art, in an internal combustion engine (ICE), the combustion process and pollutant emissions are worst at engine start-up, when the ICE is still cold. In order to reduce the warm-up time necessary to make the internal combustion engine fully effective, i.e. in order to speed up the warm-up of the engine, is common technique to divert the coolant flowing in the cooling loop circuit back to the engine, without allowing the coolant to reach the relevant radiator, till the coolant temperature, and hence the engine, reaches a target temperature, that is around 90° C.

In this regard, a cooling circuit of an internal combustion engine comprises a circuit loop for the coolant (e.g. water), connecting the engine to the radiator, and a coolant pump. The cooling circuit is usually provided with a by-pass conduit to exclude the radiator, as well as with a thermostat that allows the coolant to divert back to internal combustion engine, and hence it prevents the coolant from flowing through the radiator, till the coolant temperature reaches said target temperature, that is generally about 90° C.

Such a thermostat, that is a three-way valve actuated by temperature, is usually a wax-type thermostat, in which a thermostat body comprises two inlets, coming from the engine via the by-pass conduit, and from the radiator respectively, and one outlet directed to the engine, as well as a closure element integral to a piston that is slidingly actuated by wax contained in a wax chamber, which in turn is thermally connected to the coolant flowing through the thermostat body.

In one example, the closure element of thermostats in a cooling system of an internal combustion engine opens or closes the pathway between the inlet from the radiator and the outlet to the engine, while usually the pathway between the inlet from engine and the outlet to engine remains always open.

The thermostat includes a return spring biasing the closure element towards its closing position and, since the piston integral to the closure element of the thermostat is mechanically linked to the wax in the wax chamber, when the wax increases its volume (due to the raising of the coolant temperature within the thermostat body) the piston is pushed by the same wax, in contrast to the spring action, to move the closure element until it reaches its opening position.

Usually wax is chosen in such a way that when the target temperature of the coolant is almost reached, it changes its status from solid to liquid, expanding its volume as well, and thus pushing the piston in contrast to the spring and opening the pathway between the radiator inlet and the engine outlet of the thermostat.

To improve the behavior of the thermostat, is well known to provide it with heating means, generally constituted by some electrical heater regulated by the ECU (Engine Control Unit) of the power-train, acting by heating the wax in said wax chamber.

The presence of an electrical heater for heating the wax even when the coolant has not yet reached the target temperature, thus opening the pathway between the radiator and the engine when the ECU decides it is appropriate, allows a more stable behavior of the thermostat as well as a quick cooling of the engine when the heat produced from this latter may cause overheating problems to the same engine.

Overheating problems may affect the wax contained in the wax chamber of the thermostat, as well, when the coolant temperature raises too much, thus causing the change of the wax state from solid to gas, which may damage the wax thermostat.

Such overheating problems affecting the wax in the wax chamber may also arise when the aforesaid heating means are actuated at the engine start-up in order to allow the engine cooling—i.e. to allow the coolant flowing through the radiator—even at low temperatures of the coolant.

In fact, in presence of certain external and/or internal thermodynamic conditions of the powertrain system, it may be useful to allow the coolant to flow through the radiator, thus cooling the internal combustion engine, even if the coolant temperature has not yet reached the aforesaid target temperature.

In this case, also due to the fact that said heating means are usually controlled by the ECU with an open loop control, said heating means may heat the wax in the wax chamber too much, which may damage the wax thermostat.

Thus, it may be desirable to provide a new wax-type thermostat for the cooling system of an internal combustion engine that does not show the problems described above, and hence that prevents damage to the wax thermostat. It may also be desirable to provide a wax-type thermostat that allows the release of more heat to the wax so that the opening of the thermostat can be anticipated, without the risk of damaging the wax thermostat. In addition, other objects, desirable features and characteristics will become apparent from the subsequent summary and detailed description, and the appended claims, taken in conjunction with the accompanying drawings and this background.

SUMMARY

According to one of various exemplary embodiments of the present disclosure, the wax-type thermostat for the cooling system of an internal combustion engine provided with a radiator and a coolant loop circuit, linking the radiator to the internal combustion engine, and having a by-pass conduit, comprises:
- a thermostat body with a radiator inlet for feeding the coolant from the radiator, an internal combustion engine inlet, for feeding the coolant from said by-pass conduit, and an internal combustion engine outlet for feeding the coolant towards the internal combustion engine;
- a piston integral to a closure element that is movable between a closing position and an opening position, and vice-versa, of a thermostat internal pathway connecting said radiator inlet to said internal combustion engine outlet;
- a wax chamber in thermal connection to the coolant within the thermostat body;
- a first spring, with spring constant K, to return the closure element towards its closing position;

means for moving the piston when a volume variation in the wax contained into the wax chamber occurs.

Advantageously the wax-type thermostat also comprises a movable body that moves from a position protruding into said wax chamber and a position retracted from the wax chamber within a relevant seat, and elastic means biasing the movable body towards said position protruding into the wax chamber.

As will be apparent by the following description, the provision of a retractable body within the wax chamber that, when retracted, enlarges the internal volume of the same wax chamber allowing the wax contained therein to expand without stressing too much the walls of the same wax chamber, allows the thermostat to withstand any possible overheating of the wax without being damaged.

According to one of various exemplary embodiments of the present disclosure, the wax chamber is placed within the piston and said means for moving the piston comprises at least one tubular element protruding within the wax chamber, such a way the piston is axially slidable having regard to the tubular element. In this case, the aforesaid movable body is a retractable pin slidably inserted within the tubular element protruding within the wax chamber, in a telescopically coupling. Elastic means, made up of a second spring, are interposed between the tubular element and the retractable pin.

This solution, as the skilled person may appreciate, proves to be structural simple and compact, as well as effective in avoiding overheating problems possibly affecting the wax within the wax chamber. Said retractable pin thus acts as a safety pin that avoids harmful and undesired consequences to the wax-type thermostat when overheating of the wax occurs.

According to another exemplary embodiment of the present disclosure, heating means for heating the wax within the wax chamber, in the form of an electrical actuated heater that is placed within the aforesaid retractable pin, are provided.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2 is a schematic layout of a cooling system for an internal combustion engine to which an exemplary embodiment of the present disclosure may apply;

FIG. 3 is a schematic frontal cross-section view of a wax-type thermostat, according to one exemplary embodiment of the present disclosure, with the closure element in its starting close position;

FIG. 4 is a schematic frontal cross-section view of the wax-type thermostat of FIG. 3, with the closure element held in its open position thanks to the wax volume expansion in the thermostat wax chamber; and FIG. 5 is a schematic frontal cross-section view of the wax-type thermostat of FIG. 3, with the closure element held in its open position and a safety pin within the wax chamber retracted in a relevant seat to accommodate a greater wax volume expansion in the thermostat wax chamber.

DETAILED DESCRIPTION

Figure 1:
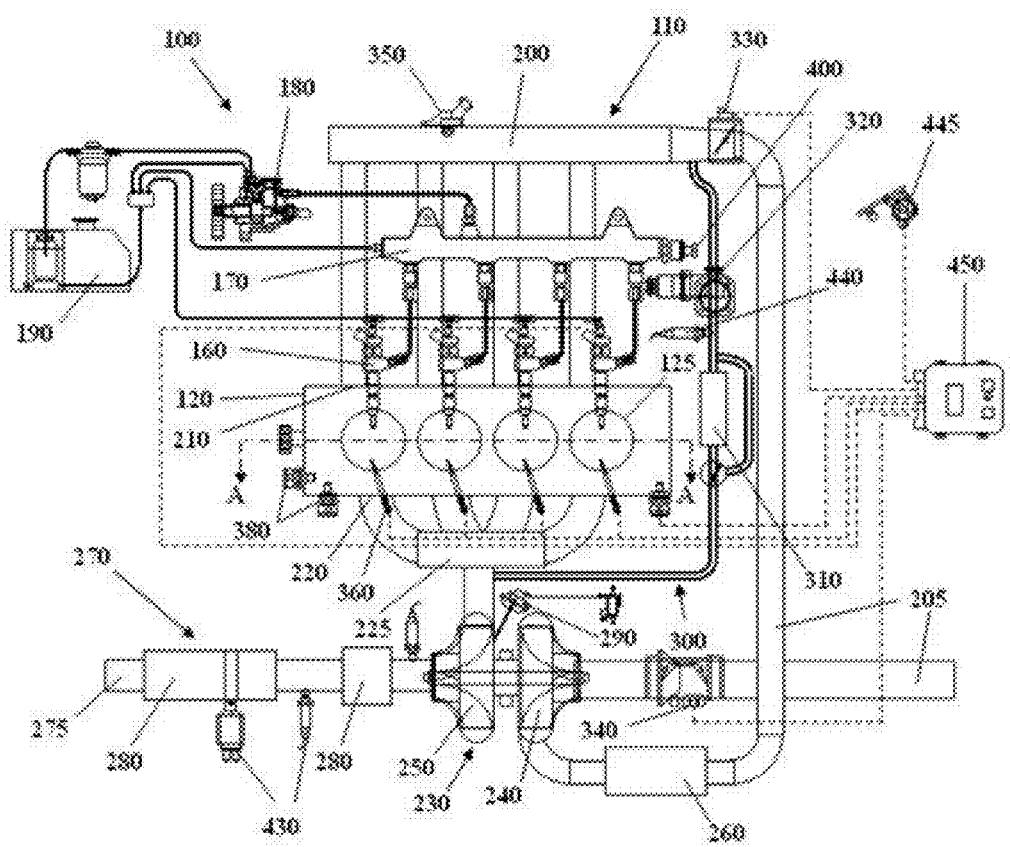
FIG. 1 is a schematic layout of a diesel power-train system to which various exemplary embodiments of the present disclosure may apply.

The following detailed description is merely exemplary in nature and is not intended to limit the present disclosure or the application and uses of the present disclosure. Furthermore, there is no intention to be bound by any theory presented in the preceding background or the following detailed description.

With reference to FIG. 1, it should be pointed out that the exemplary embodiments of the wax-type thermostat herein described, according to some exemplary embodiments of the present disclosure, may be applied in an automotive system 100 that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other exemplary embodiments, a throttle body 330 may be provided to regulate the flow of air into the manifold 200. In still other exemplary embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other exemplary embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other exemplary embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

The automotive system 100 may also comprise an exhaust gas temperature sensor placed at the aftertreatment device 280 or, in any case, downstream to the ICE 110, e.g. at exhaust manifold 225 or at the exhaust ports 220.

In one example, the thermostat 1 according to an exemplary embodiment of the present disclosure finds application in a coolant loop circuit of an ICE cooling system, schematically depicted in FIG. 2, that comprises a first main loop, with a main conduit 3 connecting an internal combustion engine 2, a radiator 4, a thermostat 1 and a pump 6. A by-pass conduit 5 directly connecting a portion of the main conduit 3 placed upstream from the radiator 4 to the thermostat 1 excludes the radiator 4 from the loop, thus acting as a "short-circuit".

The radiator 4 and the pump 6 are generally known in the art. Moreover, coolant running in the coolant loop circuit herein described is generally water.

The thermostat 1 is realized as a three way valve and acts by allowing or preventing the coolant from flowing from the radiator 4 to the engine 2. In one example, the thermostat 1 is a wax-type thermostat in which volume variations of wax contained in a wax chamber causes opening or closing of that branch of the cooling main loop connecting the radiator 4 to the pump 6, and hence to the engine 2.

With reference to FIGS. 3-5, thermostat 1 comprises a thermostat body 21 in which are cut a first ICE inlet 7 feeding the coolant directly from the internal combustion engine (ICE) 2 via the by-pass conduit 5 to the thermostat 1, a second radiator inlet 8 feeding the coolant from the radiator 4 to the thermostat 1, and an ICE outlet 20 directing the coolant from thermostat 1 to the pump 6, which in turn feeds the coolant to the engine 2.

The thermostat 1 on the inside also comprises a closure ring 12, integral to the thermostat body 21, and defining an aperture into which axially slides a piston 9 integral, at one of its ends, to a closure element 15, that in turn engages or disengages said aperture.

The aperture defined by the closure ring 12 is placed within a pathway, internal to the same thermostat body 21, which connects the radiator inlet 8 to the ICE outlet 20. Closing or opening the aperture within closure ring 12 by means of said closure element 15 causes the closure or opening, respectively, of the pathway between the radiator inlet 8 and the ICE outlet 20.

The closure element 15, integral to the piston 9, is therefore movable from a position in which it closes the aperture defined by the closure ring 12, and thus it closes the pathway between the radiator inlet 8 and the ICE outlet 20, to a position in which it opens the aperture of the closure ring 12, and hence it opens said pathway from the radiator inlet 8 to the ICE outlet 20, and vice-versa.

The thermostat 1 also comprises a wax chamber 14, placed on the inside of the thermostat body 21, which is thermally connected to the coolant flowing through the inside of the thermostat 1.

Wax chamber 14 contains a wax that is chosen such a way it changes its volume, generally by changing its state from solid to liquid, when its temperature reaches a predefined target temperature (that is usually about 90° C.).

According to one exemplary embodiment of the present disclosure, the wax chamber 14 is realized into the piston 9 and thus slides integrally thereto.

Within the wax chamber 14 protrudes a steady tubular element 10, integral to the thermostat body 21, which acts, as will be apparent afterwards, as a means for moving the piston 9, when a volume change of the wax within the wax chamber 14 occurs.

More in detail, the tubular element 10 extends from the upper internal wall (as in FIGS. 3-5) of the thermostat body 21 to the wax chamber 14, protruding therein along the same axial direction of the piston 9.

The tubular element 10 enters the wax chamber 14 through an aperture cut in the upper end of the piston 9—with a relevant ring seal keeping the wax chamber insulated—such a way the piston 9, and hence the wax chamber 14, may axially slide relative to said steady tubular element 10.

In this way, when wax undergoes a volume change within the wax chamber 14, the tubular element 10 acts as a steady contrast element allowing the piston 9, and thus the wax chamber 14, to slide relative to the same tubular element 10.

For example, when the wax expands in the chamber 14, i.e. when it generally changes state from solid to liquid, it applies a certain pressure on the steady tubular element 10 and on the inner walls of the wax chamber 14, and thus on the piston 9, that causes the piston 9 to axially slide relative to the same tubular element 10.

When, on the contrary, the wax volume reduces in the wax chamber 14, as will be explained afterwards, a first return spring 11, acting on the piston 9, will return back the same piston 9 in its starting position by sliding relative to said tubular element 10.

It should be considered that any other known contrast element placed in the wax chamber 14 and steadily opposing to the wax volume changes (e.g. expansions), and thus allowing the movement of the piston 9, may alternatively be used instead of the aforesaid tubular element 10.

It should also be noticed that, as the skilled person will appreciate, even if it has been described above that the wax chamber 14 is placed within the piston 9 and the tubular element 10, acting as a means for moving the piston 9 when a wax volume change occurs, is steady, any other configuration of these components within the thermostat body 21 known in the art may be alternatively carried out, without departing from the scope of the present disclosure. For example, the wax chamber 14 may be steadily integral to the thermostat body 21 and the piston 9 may be placed in sliding connection within said possible steady wax chamber 14, and the stem of piston 9 may act as said means for moving the piston 9 when a wax volume change within the chamber 14 occurs, instead of the above-described tubular element 10.

The thermostat body 21, as already mentioned, also includes a spring housing 13, integral thereto, as well as a first spring 11, with spring constant K, acting between said spring housing 13 and a connecting element 16 that is integral to that end of the piston 9 opposing to the closure element 15 (i.e. the upper end in FIGS. 3-5).

The spring 11, that in the exemplary embodiment of the present disclosure herein described is a helical metal spring, acts on the connecting element 16 such a way it biases the piston 9 and the relevant closure element 15 towards the closing position of the same closure element 15, in which this latter closes the pathway from the radiator inlet 8 to the ICE outlet 20.

As the skilled person may understand, any other elastic means known in the art acting on the piston 9 in such a way they bias this latter towards the aforesaid closing position of the closure element 15 may alternatively be used instead of the herein described first spring 11.

Within the wax chamber 14 is also advantageously housed a movable body 18 that is mounted therein in such a way that it can move, in an alternating way, from a protruding position in which it extends within the wax chamber 14, to a retracted position, in which it returns back within a proper seat provided within the same wax chamber 14, in order to increase the expansion volume of the wax at high pressures inside the wax chamber 14, as it will be clarified afterwards.

Such a movable body is further biased by relevant elastic means 17 towards its protruding position within the wax chamber 14.

In the exemplary embodiment of the present disclosure herein described, such a movable body has the shape of a pin 18 that is housed within the tubular body 10 and it is axially slidable within this latter. For example, the pin 18 is telescopically coupled to the tubular body 10, this latter acting as the seat for the pin 18.

It is evident that other forms of coupling between the pin 18 and the seat/tubular element 10 allowing said pin 18 to be retracted from the wax chamber 14 are contemplated and fall within the scope of the present disclosure.

The aforesaid elastic means biasing the pin 18, according to this exemplary embodiment of the present disclosure, comprises a second spring 17, with spring constant Kp, and in the form of a helical metallic spring, also housed within the tubular body 10 and interposed between a closed upper end of the tubular body 10 (integral to the thermostat body 21) and the pin 18 inserted in the same tubular body 10 through a lower open end thereof.

It should be mentioned that, as it will be clear in what follows, the spring constant Kp of the second spring 17 is properly greater than the spring constant K of the first spring 11, such a way, according to the Hooke's Law, the second spring 17 opposes a greater resistance to be compressed or elongated than the first spring 11 does.

This means that, as will be described later, the second spring 17 will start to compress (or to elongate) from its starting position (i.e. in theory its equilibrium position), pushed via the pin 18 by the expansion of the wax within the wax chamber 14, only when the first spring 11 has substantially reached its maximum compression (or elongation) from its starting position (i.e. in theory its equilibrium position) due to the movement of the piston 9, caused by the initial expansion of the wax within the wax chamber 14.

According to one exemplary embodiment of the present disclosure, the thermostat 1 also comprises heating means for heating the wax within the wax chamber 14. Such a heating means are generally made up by an electrical actuated heater 19 that is controlled by the ECU of the power-train system, according to an open loop control. Said electrical actuated heater may be placed within the pin 18 in one example.

The operation of the thermostat 1, according to an exemplary embodiment of the present disclosure, is the following.

The piston 9 and consequently the closure element 15, under the action of the first spring 11, are initially in the closed position. In further detail the closure element 15 is in engagement position with the closure ring 12 and thus the radiator inlet 8 is closed (FIG. 3). When the engine 1 is started, the coolant, typically water, coming from the radiator 4 is prevented from flowing back to the engine 1, as it is short-circuited by the by-pass conduit 5. Thus the coolant, as it is not under the action of the radiator 4, is not cooled and provides for a quick warm-up of the engine 1.

Meanwhile, the solid wax contained in the wax chamber 14 within the piston, is warmed by the coolant flowing through the thermostat 1. When the coolant reaches a target temperature (generally around about 90° C.) the wax changes its status from solid to liquid and expand its volume in the wax chamber 14, pushing on the piston 9 and on the tubular element 10. Thus the piston 9 begins to slide along said tubular element 10, so that the radiator inlet 8 is opened and the coolant which has been cooled by the radiator 4 is admitted in the circuit (FIG. 4).

The thermal power released on the wax must be carefully calibrated. If it is too high, and the opening of the radiator inlet 8, and thus the cooling action of the coolant, isn't enough quick and/or effective, it could lead to a further change of status of the wax from liquid to gas, with undesired consequences.

To prevent the above said problem, the thermostat 1 is provided with the movable element 18 protruding inside the wax chamber 14. It is now presented an exemplary embodiment where the movable body 18 is a pin and the relevant seat is the tubular element 10, but the following description can be applied also to other exemplary embodiments including any movable body 18 capable of moving from a position protruding into the wax chamber 14 and a position retracted from said wax chamber 14 within a relevant seat. Elastic means 17 different from a spring can be used, too.

At low pressures inside the wax chamber 14, the pin 18 is kept in its position, protruding into the wax chamber 14, by the action of the second spring 17. When the pressure reaches high values, said pressure wins over the force exerted by the second spring 17, causing the pin 18 to retract within the tubular element 10 and thus increasing the internal volume of the wax chamber 14, so that the wax can further expand to assure the safety of the thermostat 1 (see FIG. 5).

In one example, for optimal operations of the first spring 11 and the second spring or elastic means 17 the spring constant K of the first spring 11 can be lower than the spring constant of the spring, or elastic element 17, Kp, as to say Kp>K. This involves the fact that when the wax in the wax chamber 14 starts to expand, the first spring 11 starts to be urged by the piston 9, while the second spring 17—being stiffer—stays not active. When the expansion of the wax within the wax chamber 14 exceeds an expected value in which the piston 9 has reached its end position with respect to the tubular element 10, the second spring 17 starts to be urged by the wax expansion, and thus it allows the retraction of pin 18 within the seat/tubular element 10.

In one exemplary embodiment of the present disclosure herein described, the movable element 18 is provided with heating means 19 acting on the wax chamber. Generally, said heating means 19 are electrically actuated and connected with the ECU (Electronic Control Unit) of the power unit (not shown). Said heating means 19 enable further controls on the temperature and consequently on the expansion of the wax inside the wax chamber 14 and thus on the displacement of the piston 9. According to this exemplary embodiment of the present disclosure the wax can be heated by the concurrent action of the coolant flowing through the thermostat 1 and the action of said heating means 19. As a result, the wax expands more quickly inside the wax chamber 14, thus the opening of the radiator inlet 8 can be operated before that the coolant, and so the engine 2, reaches the target temperature and overheating of said engine 2 is thus avoided.

Because of the double heat source, i.e. the heating means 19 and the coolant, said exemplary embodiment transfers more thermal power to the wax, which may increase the risk of said harmful and undesired consequences occurring when the wax is overheated. It should be noted that the ECU operates in open loop on the heating means 19, so that the ECU cannot guarantee a prompt response to dangerous situations. The action of the movable body 18 as above disclosed assures a correct and safe operating for the thermostat 1, even in this circumstances.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A wax-type thermostat for the cooling system of an internal combustion engine provided with a radiator and a coolant loop circuit, linking the radiator to the internal combustion engine, and having a by-pass conduit, the thermostat comprising:
   a thermostat body with a radiator inlet for feeding the coolant from the radiator, an internal combustion engine inlet, for feeding the coolant from said by-pass conduit, and an internal combustion engine outlet for feeding the coolant towards the internal combustion engine;
   a piston integral to a closure element that is movable between a closing position and an opening position, and vice-versa, of a thermostat internal pathway connecting said radiator inlet to said internal combustion engine outlet;
   a wax chamber in thermal connection to the coolant within the thermostat body;
   a first spring, with spring constant K, to return the closure element towards its closing position;
   at least one tubular element protruding within the wax chamber for moving the piston when a volume variation in the wax contained in the wax chamber occurs; and
   a movable body that moves from a position protruding into said wax chamber and a position retracted from said wax chamber within a relevant seat, and a second spring biasing said movable body towards said position protruding into the wax chamber,
   wherein said second spring is housed within said at least one tubular element.

2. The wax-type thermostat according to claim 1, wherein the wax chamber is disposed within the piston, the piston being slidable relative to said at least one tubular element.

3. The wax-type thermostat according to claim 2, wherein said movable body is a pin and said relevant seat is said at least one tubular element protruding within the wax chamber.

4. The wax-type thermostat according to claim 3, wherein said pin is telescopically coupled to said at least one tubular element.

5. The wax-type thermostat according to claim 1, wherein said second spring has a spring constant Kp.

6. The wax-type thermostat according to claim 5, wherein said spring constant Kp of said second spring is higher than said spring constant K of said first spring.

7. The wax-type thermostat according to claim 1, further comprising a heater for heating the wax within said wax chamber.

8. The wax-type thermostat according to claim 7, wherein said heater is disposed within said movable body.

9. The wax-type thermostat according to claim 7, wherein said heater comprises an electrically actuated heater.

10. A cooling system for an internal combustion engine comprising:
    a radiator;
    a coolant loop circuit linking the radiator to the internal combustion engine, and having a by-pass conduit, as well as a wax-type thermostat, the thermostat including:
    a thermostat body with a radiator inlet for feeding the coolant from the radiator, an internal combustion engine inlet, for feeding the coolant from said by-pass conduit, and an internal combustion engine outlet for feeding the coolant towards the internal combustion engine;
    a piston integral to a closure element that is movable between a closing position and an opening position of a thermostat internal pathway connecting said radiator inlet to said internal combustion engine outlet;
    a wax chamber in thermal connection to the coolant within the thermostat body;
    a first spring, with spring constant K, to return the closure element towards its closing position; and
    at least one tubular element protruding within the wax chamber for moving the piston when a volume variation in the wax contained in the wax chamber occurs; and
    a movable body that moves from a position protruding into said wax chamber and a position retracted from said wax chamber within a relevant seat, and a second spring with spring constant Kp that biases said movable body towards said position protruding into the wax chamber,
    wherein said second spring is housed within said at least one tubular element.

11. The cooling system according to claim 10, wherein the wax chamber is disposed within the piston and wherein said at least one tubular element protrudes within the wax chamber, the piston being slidable relative to said at least one tubular element.

12. The cooling system according to claim 11, wherein said movable body is a pin and said relevant seat is said at least one tubular element protruding within the wax chamber.

13. The cooling system according to claim 12, wherein said pin is telescopically coupled to said at least one tubular element.

14. The cooling system according to claim 10, wherein said spring constant Kp of said second spring is higher than said spring constant K of said first spring.

15. The cooling system according to claim 10, further comprising a heater for heating the wax within said wax chamber.

16. The cooling system according to claim 15, wherein said heater is disposed within said movable body.

17. The cooling system according to claim 15, wherein said heater comprises an electrically actuated heater.

18. A power-train system comprising:
    an internal combustion engine;
    a cooling system for the internal combustion engine has a radiator, a coolant loop circuit linking the radiator to the internal combustion engine and having a by-pass conduit, as well as a wax-type thermostat, the thermostat including:
a thermostat body with a radiator inlet for feeding the coolant from the radiator, an internal combustion engine inlet, for feeding the coolant from said by-pass conduit, and an internal combustion engine outlet for feeding the coolant towards the internal combustion engine;
a piston integral to a closure element that is movable between a closing position and an opening position of a thermostat internal pathway connecting said radiator inlet to said internal combustion engine outlet;
a wax chamber in thermal connection to the coolant within the thermostat body, the wax chamber placed within the piston;
at least one tubular element protruding within the wax chamber, the piston being slidable relative to said at least one tubular element;
a first spring, with spring constant K, to return the closure element towards its closing position; and
a movable body that moves from a position protruding into said wax chamber and a position retracted from said wax chamber within a relevant seat, and a second spring with spring constant Kp that biases said movable body towards said position protruding into the wax chamber,
wherein said second spring is housed within said at least one tubular element.

* * * * *